No. 891,137.
PATENTED JUNE 16, 1908.
O. O. BERQUAM.
THRESHING MACHINE.
APPLICATION FILED JAN. 7, 1907.
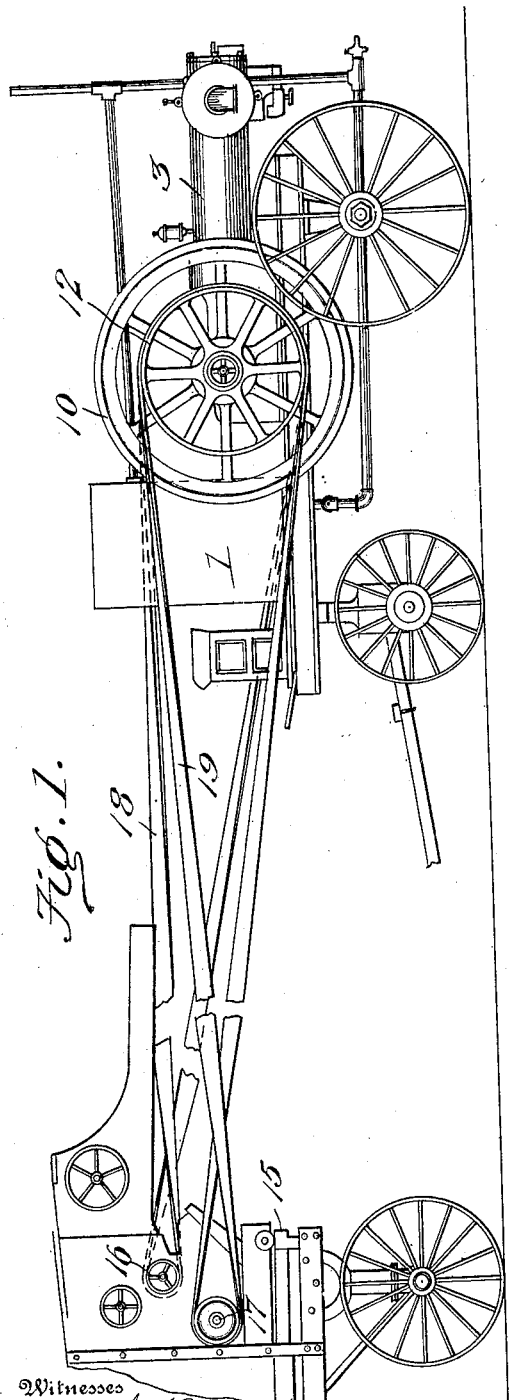
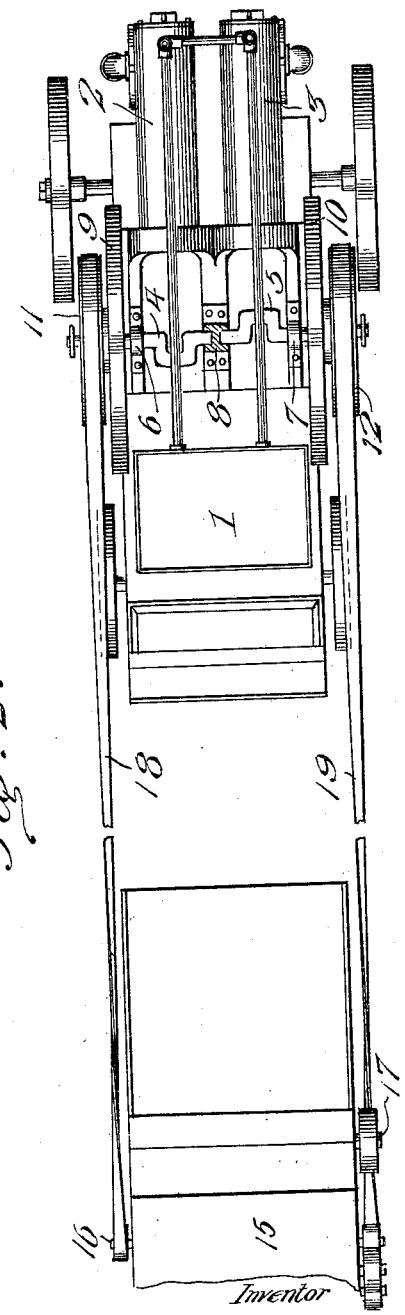

UNITED STATES PATENT OFFICE.

OLAI O. BERQUAM, OF GRAFTON, NORTH DAKOTA.

THRESHING-MACHINE.

No. 891,137.     Specification of Letters Patent.     Patented June 16, 1908.

Application filed January 7, 1907. Serial No. 351,216.

*To all whom it may concern:*

Be it known that I, OLAI O. BERQUAM, a citizen of the United States, residing at Grafton, in the county of Walsh and State of North Dakota, have invented new and useful Improvements in Threshing - Machines, of which the following is a specification.

This invention relates to motors for driving threshing machines and grain separators; and it has for its object to simplify and improve the construction and operation of this class of devices.

When threshing machines are driven by power, such as a steam- or gasolene engine, it has been customary to transmit the motion from the power to the cylinder-shaft of the threshing machine, and to transmit motion from said cylinder-shaft, by belting or otherwise, directly or indirectly, to the feeding-mechanism (when separate feeding mechanism is employed), to the separating mechanism, to the fan, and to the various driven parts or elements of the threshing machine. This has been productive of a serious objection in that, when the cylinder is heavily fed, the speed, not only of the cylinder but of all the driven parts has been reduced, thus causing the grain to be imperfectly cleaned while, on the other hand, when the cylinder has been lightly fed, the speed of all the driven parts would be increased, thus causing grain to be blown over the sieves and wasted.

To overcome these objections the present invention consists in a motor for threshing machines which includes two separate and independently driven shafts, from one of which motion is transmitted to the cylinder of the threshing machine while from the other driven shaft motion is transmitted to the fan-shaft of the threshing machine from which motion may in turn be belted or otherwise transmitted to the feeding and cleaning mechanisms and to other parts of the machine, which will thus be driven independently of the threshing cylinder, and at a speed unaffected by the speed of the latter.

The invention, with these and other ends in view which will readily appear as the nature of the invention is better understood, consists in the improved construction and novel arrangement and combination of parts which will be hereinafter fully described, and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to, when desired.

In the drawings:—Figure 1— is a side-elevation showing the improved device mounted in position for operation. Fig. 2— is a top plan view of the same.

Corresponding parts in the several figures are denoted by like characters of reference.

Upon a portable truck or frame, 1, there are arranged or mounted two separate engines or motors, 2 and 3, which may be of any desired construction and nature, and which, in the drawings, have been conventionally illustrated.

The main shafts, 4 and 5, which are driven by the engines 2 and 3, respectively, are supported for rotation in boxes or bearings, 6, 7 and 8, the latter of which is disposed intermediate the two former which are located at the sides of the truck-frame; the shafts being disposed in axial alinement with each other, so that three bearings will suffice to support the two shafts. The shafts 4 and 5 are provided, respectively, with fly-wheels, 9 and 10, and with band wheels or pulleys, 11 and 12.

15 designates a portion of the frame of an ordinary threshing machine or grain separator; 16 is the cylinder-shaft, and 17 the fan-shaft. In the operation of the invention motion is transmitted by a belt, 18, from the shaft 4 of the motor 2 to the cylinder shaft 16, and by a belt 19 from the shaft 5 of the motor 3 to the fan-shaft 17. Motion may be transmitted, by belting or otherwise, from the fan-shaft to other parts of the threshing machine; but this it is considered unnecessary to illustrate.

It will be seen from the foregoing that the cylinder - shaft is driven independently of other parts of the threshing machine, and that the speed of such parts, including the fan, will be in nowise affected by the varying speed of the cylinder caused by unavoidable irregularity in the feeding of the machine, by the varying condition and quality of the material operated upon, and other causes which are ever present in the operation of threshing and separating machinery.

The present invention may be put into practical operation in a simple and inexpensive manner, and with highly satisfactory results, the efficiency of the threshing and cleaning or separating mechanism being greatly increased by the improved motor.

Having thus described my invention, I claim and desire to secure by Letters Patent of the United States:—

Threshing apparatus comprising a threshing machine; an independent supporting truck, two independent motors supported in parallel relation upon said truck, two independently driven motor shafts supported for rotation in alinement with each other, a driving belt connecting one motor shaft with the threshing cylinder shaft, and an independent driving belt connecting the other motor shaft with the fan shaft of the threshing machine, whereby the work of the fan will remain unaffected by variations in the load of work upon the cylinder and vice versa.

In testimony whereof, I affix my signature in presence of two witnesses.

OLAI O. BERQUAM.

Witnesses:
P. A. JÖRGENSEN,
W. JOHANSAN.